J. W. DANFORD.
BOAT PLUG.
APPLICATION FILED APR. 19, 1909.

936,312.

Patented Oct. 12, 1909.

Witnesses,
Edwin C. Axe.
Rob't Hunter

Inventor,
John Warren Danford,
by Benj. Ling
Attorney.

UNITED STATES PATENT OFFICE.

JOHN WARREN DANFORD, OF MARAZION, ENGLAND.

BOAT-PLUG.

936,312.  Specification of Letters Patent.  Patented Oct. 12, 1909.

Application filed April 19, 1909.  Serial No. 490,734.

*To all whom it may concern:*

Be it known that I, JOHN WARREN DANFORD, a subject of the King of Great Britain and Ireland, and resident of Marazion, county of Cornwall, England, have invented certain new and useful Improvements in Boat-Plugs, of which the following is a specification.

This invention has reference to an improved plug for boats and the like, which, while rendering a boat perfectly watertight when screwed down, also allows of the ready egress of water in a simple and efficient manner when in the unscrewed position.

In order that the said invention may be readily understood reference is to be had to the following description and accompanying sheet of drawings in which:—

Figure 1:
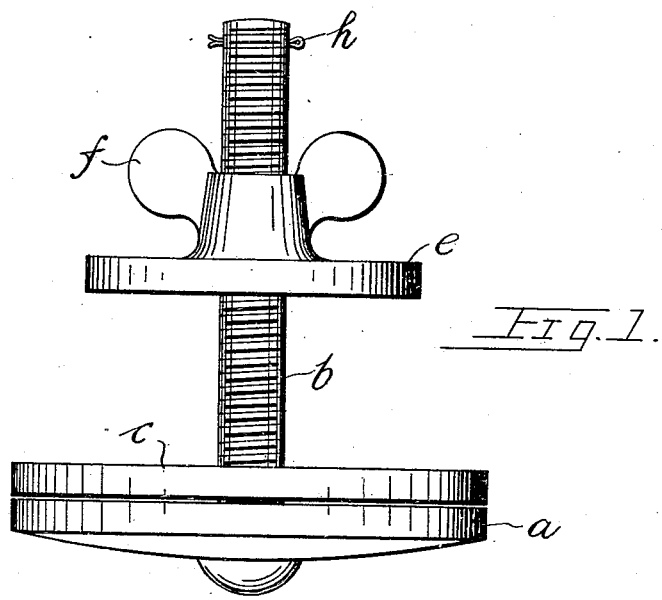
Figure 2:
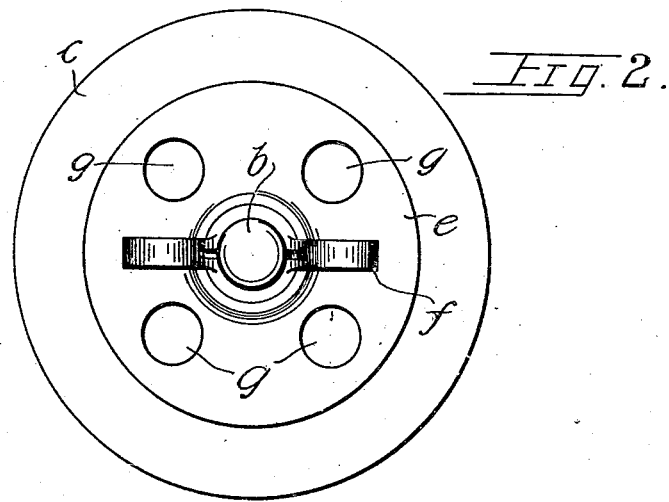

Figure 1 illustrates the improved plug in outside elevation. Fig. 2 is a plan view of the device.

Like letters of reference indicate corresponding parts in both views.

In carrying the said invention into effect, a circular disk of brass or other suitable metal $a$ is provided, to which is centrally fixed in any suitable manner a projecting screw $b$. Directly above the aforesaid disk $a$, and of a corresponding size and shape thereto, is a washer or washers of leather, rubber or like material $c$.

A disk $e$, rotatable on the projecting screw $b$, is provided and furnished with a thumb-screw or other turning means $f$. This member is preferably smaller in diameter than the lower disks and is perforated with a suitable number of holes $g$, preferably four, which are located as illustrated. A pin $h$ limits the travel of this member. Egress of water is permitted by these holes on the unscrewing of thumb-screw. A secure and perfectly tight joint is made by reason of the washer or washers $c$.

Having now described my invention, what I claim as new and desire to secure by Letters Patent of the United States is:—

An improved boat plug comprising a disk of metal and a disk or disks of leather, or like material, a projecting screw fixed thereto and a disk with turning means rotatable on said projecting screw, said rotatable disk being provided with holes for the purposes described.

In testimony whereof I have affixed my signature in presence of two witnesses.

JOHN WARREN DANFORD.

Witnesses:
C. ARTHUR LE GEYT,
J. H. HAMMILL.